B. V. NORDBERG.
VALVE FOR AIR COMPRESSORS AND THE LIKE.
APPLICATION FILED APR. 2, 1920.
1,400,373.
Patented Dec. 13, 1921.
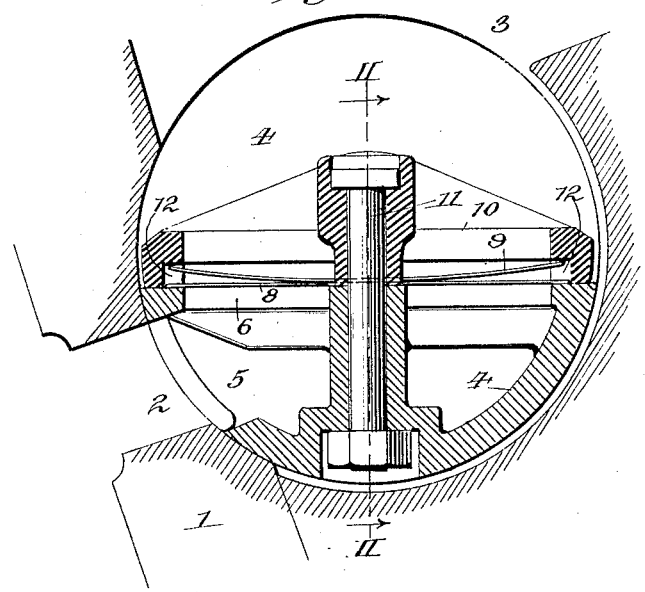
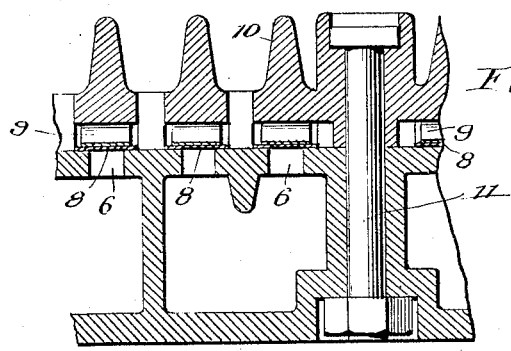
Inventor:
Bruno Victor Nordberg
By Dodge and Sons
Attorneys

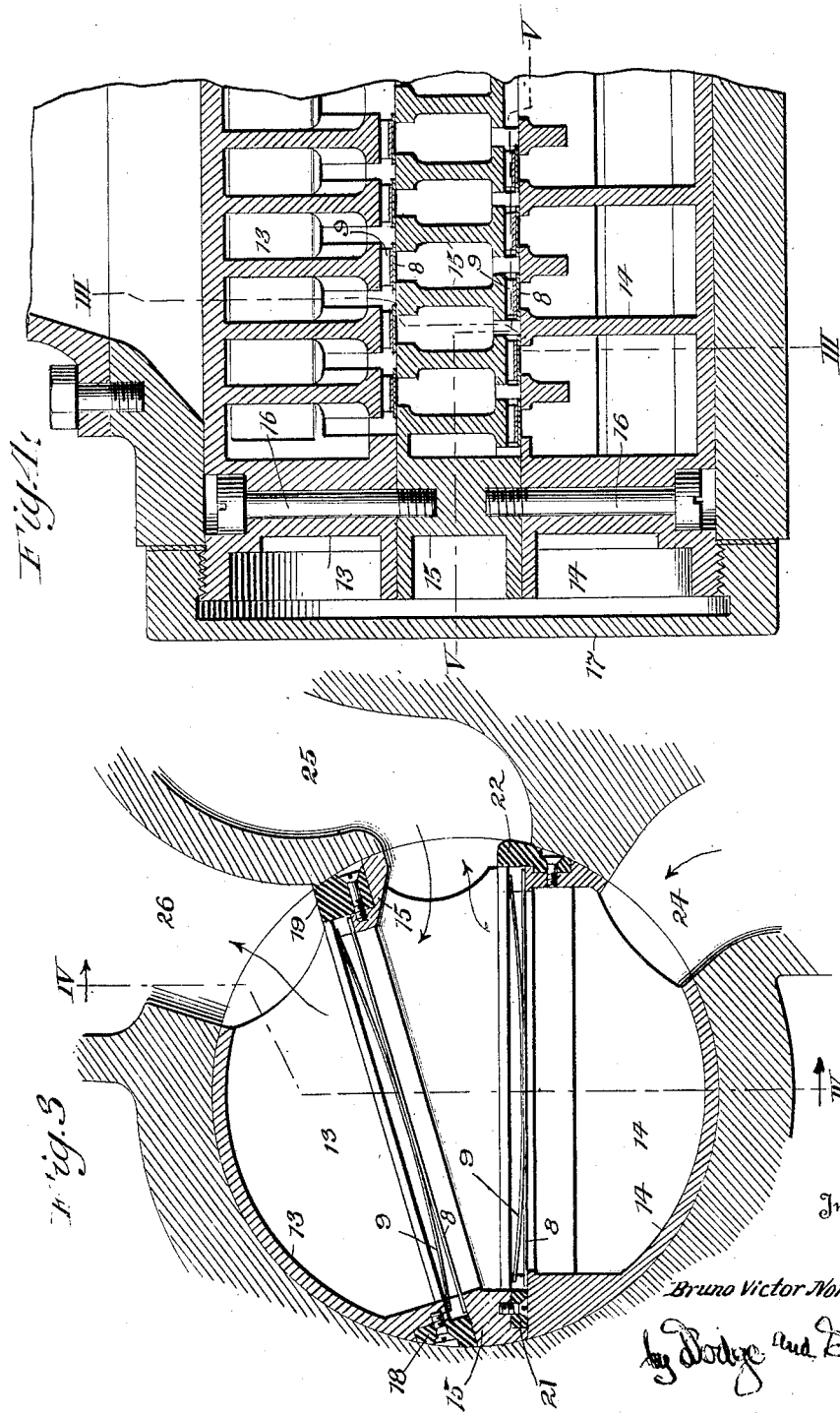

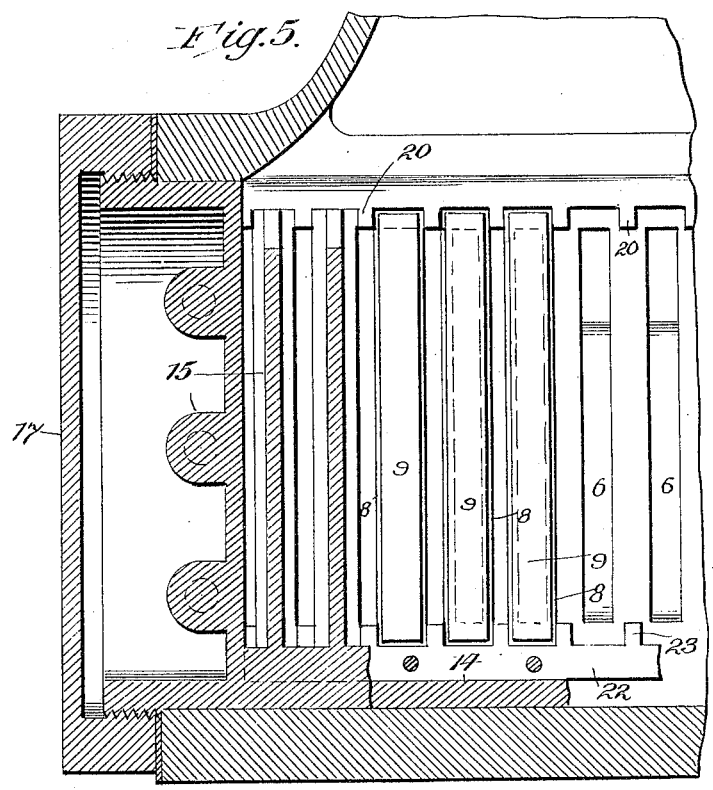
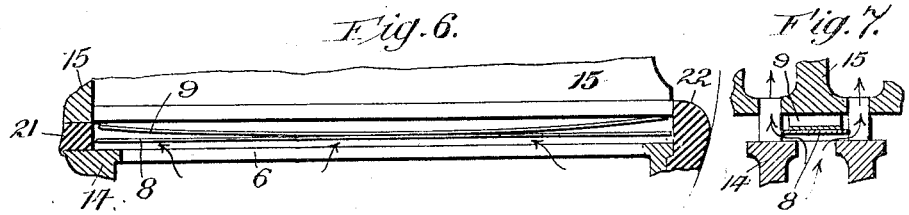
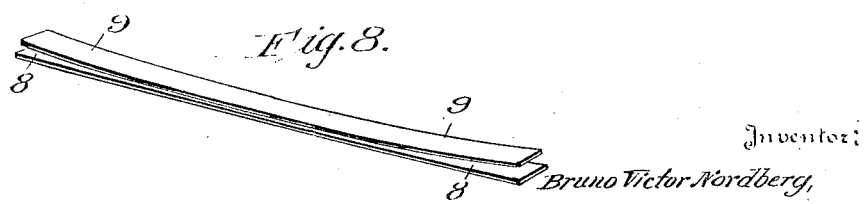

UNITED STATES PATENT OFFICE.

BRUNO VICTOR NORDBERG, OF MILWAUKEE, WISCONSIN.

VALVE FOR AIR-COMPRESSORS AND THE LIKE.

1,400,373. Specification of Letters Patent. Patented Dec. 13, 1921.

Original application filed August 21, 1917, Serial No. 187,487. Divided and this application filed April 2, 1920. Serial No. 370,687.

*To all whom it may concern:*

Be it known that I, BRUNO V. NORDBERG, a citizen of the United States, residing at Milwaukee, in the county of Milwaukee and State of Wisconsin, have invented certain new and useful Improvements in Valves for Air-Compressors and the like, of which the following is a specification.

This invention pertains to self acting valves for air compressors, that is valves that are opened and closed by the action of the air flowing into and out of the compressor.

During the past few years the rotative speed of air compressors has been greatly increased because it was found necessary or desirable to operate them by means of electric motors, and although the higher speed also reduces the efficiency of the compressors, the convenience of gearing the compressors to the motor or of directly connecting the same to the motor, makes it possible to sacrifice some economy to the higher speed.

The higher compressor speed has brought into use several types of valves made of sheet steel, the object being to reduce the mass of the valve so as to make it quicker and also to reduce the lift of the valve so that the greatest possible valve opening is obtained with the smallest possible motion or lift of the valve.

The valve forming the basis of the present invention is of the same general type, and the invention has for one of its objects the production of a valve which will afford a maximum exhaust or intake passage as the case may be, or in other words, to obtain as much area for the exhaust or intake through or by the valve as there is through the opening covered by the valve, such opening being substantially unobstructed by the valve when the valve is lifted off its seat.

The invention has for a further object the production of a valve casing or seat casting so constructed that it may be readily placed in position and as readily removed if for any reason it becomes necessary or desirable to substitute a new valve mechanism for one previously positioned.

Several embodiments are illustrated in the annexed drawings, wherein:

Figure 1 is a transverse sectional view of the valve mechanism shown as mounted in the end of a compressor cylinder;

Fig. 2 a longitudinal sectional view taken on the line II—II of Fig. 1;

Fig. 3 a transverse section illustrating suction and discharge valves communicating with a common port leading to the cylinder of the compressor;

Fig. 4 a longitudinal sectional view on the line IV—IV of Fig. 3;

Fig. 5 a longitudinal horizontal sectional view on the line V—V of Fig. 4;

Fig. 6 a detail longitudinal sectional view showing one of the valves lifted from its seat;

Fig. 7 a transverse section of such valve; and

Fig. 8 a perspective view of one of the valves and its spring.

Referring first to Figs. 1 and 2, 1 denotes a portion of the body of an air compressor having a port 2 leading from the space behind the compressor piston and 3 denotes the space into or through which the air is discharged after leaving the valve.

The seat of the valve, or valves, is formed in a cylindrical plug 4 provided with a series of ports or chambers 5 which lie below and are in direct communication with a series of oblong slots or ports 6 opening directly into such chambers 5.

The upper face of the wall or partition in which the ports 6 are formed is flat and a series of plate valves, preferably formed of spring metal and denoted by 8, rest upon said face, one for each port. Said valves are slightly longer and wider than the elongated ports 6 and are normally held to their seats by overlying bowed springs 9, one for each valve. As will be seen the central downwardly bowed portion of the spring contacts with the central portion of the underlying valve, and the valves and springs are held in their proper relation to each other and to the valve seat by an overlying guard plate 10 held in place by through bolts 11. Said plate is of grid like form and is provided with pockets 12 into which extend the ends of the valves and springs 8 and 9. The pockets while permitting a free movement of the spring and valve, prevent the same from shifting endwise and laterally, or in other words always insure the valve being properly positioned with reference to the seat and hold the spring in proper position with reference to the valve. The member 4 constructed as above set forth and the element 10, may be termed, respectively, seat and cap sections which form a valve chamber between them, and as seen, are provided respectively, with port and flow slots which open into said chamber.

Upon air being forced through port 2 under pressure in excess of that obtaining in space 3, the valves will be lifted from their seats. The initial movement of the valve doubtless causes the ends to rise or curve upwardly and take the curvature of the spring, and, finally the valve as a whole rises, flattening out and also flattening out the spring and carrying it up against the overlying guard. Thus the valve is raised free of its seat throughout the length and breadth and a full opening is afforded beneath and around the sides equal at least in area to that of the underlying port 6.

Immediately the pressure in 2 and 3 becomes equalized the valves close and so remain until the pressure in 2 is again in excess. In Figs. 6 and 7 the valve is shown in its mid position, the valve having been raised as a whole and the spring partly compressed.

It will thus be seen that I have provided a plate valve which affords ample clearance and one which is easy to construct and position. Furthermore, the seat casting may be turned up and can be placed in the compressor cylinder or head like the valves in a Corliss engine, that is, the openings are bored in the cylinder in which these seat castings are fitted. The advantage of this arrangement is manifest as it is possible to have on hand a complete seat casting with the valves in place which may be quickly substituted for one which may have become defective in whole or in part; thus saving much time in hunting out any particular defective valve, substituting a new one therefor and replacing the structure as a whole.

In Figs. 3, 4 and 5 there is illustrated a construction in which the suction and discharge valves of a compressor communicate with the same port leading to the cylinder, it being manifest that when the arrangement before described is used there must be separate ports for suction and discharge.

In the construction shown in the figures just mentioned the valves, which are of the same type and form as above set forth, are placed in a cylindrical shaped basket made for convenience in three parts 13, 14 and 15, the parts being held together by a series of machine screws 16. The basket when assembled is secured in the compressor head, and a cap 17 is screwed on the outer end of the basket and closes the same.

The valves and springs therefor interposed between members 13 and 15 are held against displacement by bars 18 and 19 having fingers 20 which extend in between the ends of the adjacent valves and their springs. Similar bars 21 and 22 having fingers are employed with the lower set of valves.

The intake or suction port is denoted by 24, the combined suction and discharge port by 25, which port opens into the spaces formed in the wider end of the member 15, and 26 denotes the compressed air discharge port.

As under the other construction, it is manifest that the valve element, as a whole, may be readily inserted and removed from the cylinder head and that full clearance is obtained.

It is to be noted that the valve is wholly disconnected from the spring, which simply bears thereon, and this is of advantage in that no attaching means as for instance rivets which tend to weaken the parts is employed. Furthermore this construction does not necessitate the discarding of both spring and valve when one or the other breaks. It is obvious that the spring may be used either side up, its ends bearing against the overlying retaining member and its mid-portion bearing upon the valve, as shown, or vice versa.

No claim is made herein to a ribbon or plate valve comprising united seat and cap sections forming a valve chamber between them and provided with port and flow slots respectively opening into said chamber, a valve plate loosely confined in said chamber and serving to close the port slot, and a flat bowed seating spring loosely interposed between the valve plate and the opposing surface of the cap section; or, stated in another way, to a valve seat having an elongated port, a plate valve of light mass resting thereon, a bow-shaped spring contacting said valve, and means for holding the valve and spring in proper working relation with each other and to the seat, as such construction and arrangement forms the subject matter of my application filed on or about August 21, 1917, Serial No. 187,487, and of which this application is a division.

What is claimed is,—

1. In a compressor, the combination of a fixed element having a cylindrical bore formed therein said bore being in communication with the compressor cylinder; a valve casing fitting within the bore, said casing having at least one opening formed therein with a valve seat around said opening; a plate valve overlying the opening; a spring bearing against said plate; and means for holding said valve and spring in position.

2. A valve structure for compressors and the like comprising a cylindrical shaped structure composed of three parts, the central part being wedge shaped in cross section; plate valves interposed between adjacent faces of said central member and the outer parts; a bow shaped spring resting on each valve; and removable plates secured in place adjacent the ends of said valves and spring whereby the valves and springs will 3. In a compressor, the combination of a fixed element having a cylindrical bore formed therein, said bore being in communication with the compressor cylinder; a cylindrical shaped structure composed of a plurality of elements and forming a valve casing adapted to fit within the cylindrical bore, said structure having a plurality of ports, flow slots and valve seats, one for each slot, formed therein; a series of plate-like valves, one for each valve seat and a spring resting on each valve and serving to hold the same to its seat.

4. In a compressor, the combination of a fixed element having a cylindrical bore formed therein and likewise having an intake or suction port, a combined suction and discharge port in communication with the compressor cylinder, and a discharge port, all of said ports opening into the cylindrical bore aforesaid; a valve structure composed of a plurality of parts which when assembled are cylindrical in outline and of a diameter to fit the cylindrical bore aforesaid, said valve structure being provided with a plurality of flow slots and passages and a plurality of valve seats arranged in opposed relation with reference to the combined suction and discharge port; a valve for each seat; and a spring for each valve serving to normally hold it to its seat.

5. In a compressor, the combination of a fixed element having a cylindrical bore formed therein and likewise having an intake or suction port, a combined suction and discharge port in communication with the compressor cylinder, and a discharge port, all of said ports opening into the cylindrical bore aforesaid; a valve structure composed of a plurality of parts which when assembled are cylindrical in outline and of a diameter to fit the cylindrical bore aforesaid, said valve structure being provided with a plurality of flow slots and passages and a plurality of valve seats arranged in opposed relation with reference to the combined suction and discharge port; a plate valve for each of the valve seats; and a bow shaped spring resting upon each valve and serving normally to hold the same to its seat.

6. In a compressor, the combination of a fixed element having a cylindrical bore formed therein and likewise having an intake or suction port; a combined suction and discharge port in communication with the compressor cylinder, and a discharge port, all of said ports opening into the cylindrical bore aforesaid; a cylindrical shaped valve structure composed of three parts, the central part being wedge shaped in cross section and all of said parts being provided with flow slots, the slots in the central wedge shaped part being in communication with the combined suction and discharge port; plate valves interposed between adjacent faces of said central member and the outer parts and resting upon the seats formed upon said central wedge shaped member; a bow shaped spring resting on each valve; and removable plates secured in place adjacent the ends of said valves and springs whereby the valves and springs will be properly positioned and held against displacement.

7. In a compressor, the combination of a fixed element having a cylindrical bore formed therein, said bore being in communication with an intake or suction port, a combined suction and discharge port leading to the cylinder, and a discharge port; a valve structure comprising a cylindrical shaped body composed of three parts, the central part being wedge shaped in cross section, all of said parts being provided with flow slots, the slots of the central wedge shaped member being in communication with the combined suction and discharge port aforesaid, plate valves interposed between adjacent faces of said central member and the outer parts, a spring resting on each valve and serving to hold it normally to its seat, and a cap shaped member mounted upon the outer end of said valve structure for closing the same.

8. In a compressor, the combination of a fixed element having a cylindrical bore formed therein, said bore being in communication with the compressor cylinder; a cylindrical-shaped structure composed of a plurality of elements and forming a valve casing adapted to fit within the cylindrical bore, said structure having a plurality of ports, flow slots, and valve seats, one for each slot, formed therein; and a series of valves, one for each valve seat, mounted in the structure aforesaid.

In testimony whereof I have signed my name to this specification.

BRUNO VICTOR NORDBERG.